(12) United States Patent
Yu et al.

(10) Patent No.: US 11,597,409 B2
(45) Date of Patent: Mar. 7, 2023

(54) APPARATUS FOR CONTROLLING VEHICLE AND METHOD THEREOF

(71) Applicants: Hyundai Motor Company, Seoul (KR); Kia Motors Corporation, Seoul (KR)

(72) Inventors: Min Sang Yu, Gyeonggi-do (KR); Jin Su Jeong, Gyeonggi-do (KR); Eun Young Choi, Seoul (KR); Ki Seok Seong, Chungcheongnam-do (KR); Hyeong Jin Ham, Gyeonggi-do (KR); Rosali Sun Pyun, Gyeonggi-do (KR); Dong Il Yang, Seoul (KR); Woo Jin Kim, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 320 days.

(21) Appl. No.: 16/866,151

(22) Filed: May 4, 2020

(65) Prior Publication Data
US 2021/0179145 A1 Jun. 17, 2021

(30) Foreign Application Priority Data
Dec. 12, 2019 (KR) ........................ 10-2019-0166095

(51) Int. Cl.
*B60W 60/00* (2020.01)
*B60W 10/20* (2006.01)
(Continued)

(52) U.S. Cl.
CPC ........ *B60W 60/0053* (2020.02); *B60W 10/04* (2013.01); *B60W 10/10* (2013.01);
(Continued)

(58) Field of Classification Search
CPC ........ B60W 60/0053; B60W 60/0016; B60W 60/0017; B60W 60/0018; B60W 10/04;
(Continued)

(56) References Cited

U.S. PATENT DOCUMENTS

2017/0072926 A1* 3/2017 Fukuda ................... B60T 8/74
2017/0090480 A1* 3/2017 Ho ....................... G05D 1/0214
(Continued)

FOREIGN PATENT DOCUMENTS

CN 108759849 A * 11/2018

OTHER PUBLICATIONS

T. Gruber, "Approach for Demonstrating Safety for a Collision Avoidance System" (Year: 2015).*

*Primary Examiner* — Elaine Gort
*Assistant Examiner* — Brittany Renee Peko
(74) *Attorney, Agent, or Firm* — Fox Rothschild LLP

(57) ABSTRACT

An apparatus for controlling a vehicle capable of performing autonomous driving is provided. The apparatus includes an autonomous driving device that executes the autonomous driving and generates a transition demand when it is impossible to execute the autonomous driving. A driving controller performs a minimum risk maneuver (MRM) of applying a deceleration pattern differently depending on a driving environment of the vehicle, when the transition demand is generated, but when driving manipulation by a driver does not occur. A subsequent safety ensuring function is performed according to the MRM for the driver to recognize the MRM, and a drive mode of the vehicle is changed to a drive mode with a rapid response speed to acceleration or steering.

21 Claims, 6 Drawing Sheets

(51) Int. Cl.
  *B60W 10/04* (2006.01)
  *B60W 10/30* (2006.01)
  *B60W 10/18* (2012.01)
  *B60W 50/14* (2020.01)
  *B60W 10/10* (2012.01)

(52) U.S. Cl.
  CPC .......... *B60W 10/182* (2013.01); *B60W 10/20* (2013.01); *B60W 10/30* (2013.01); *B60W 50/14* (2013.01); *B60W 60/0016* (2020.02); *B60W 60/0017* (2020.02); *B60W 60/0018* (2020.02); *B60W 2050/146* (2013.01); *B60W 2554/20* (2020.02); *B60W 2554/4049* (2020.02); *B60W 2556/40* (2020.02)

(58) Field of Classification Search
  CPC .... B60W 10/10; B60W 10/182; B60W 10/20; B60W 10/30; B60W 50/14; B60W 2554/20; B60W 2556/40; B60W 2554/4049; B60W 2050/146
  See application file for complete search history.

(56) References Cited

U.S. PATENT DOCUMENTS

| | | | | |
|---|---|---|---|---|
| 2018/0053414 A1* | 2/2018 | Qin | .................. | G08G 1/096716 |
| 2018/0197415 A1* | 6/2018 | Kurata | .................. | G08G 1/166 |
| 2019/0129416 A1* | 5/2019 | Upmanue | ............ | G05D 1/0061 |
| 2019/0300007 A1* | 10/2019 | Hilligardt | ............ | B60W 50/029 |
| 2020/0307632 A1* | 10/2020 | Tsuji | .................. | B60W 60/0016 |
| 2021/0043015 A1* | 2/2021 | Khafagy | .............. | G07C 5/0825 |
| 2021/0331706 A1* | 10/2021 | Kim | .................. | B60W 60/0027 |
| 2022/0063669 A1* | 3/2022 | Fukushige | ........ | B60W 60/0013 |
| 2022/0154817 A1* | 3/2022 | Okamoto | ................ | F16H 61/02 |

* cited by examiner

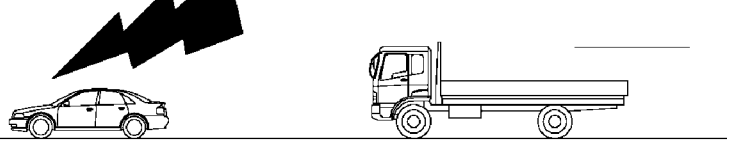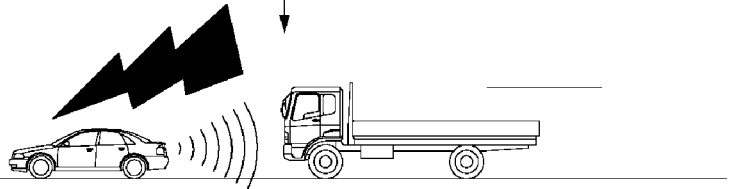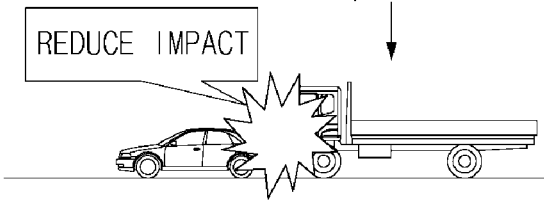

APPARATUS FOR CONTROLLING VEHICLE AND METHOD THEREOF

CROSS-REFERENCE TO RELATED APPLICATION

This application is claims the benefit of priority to Korean Patent Application No. 10-2019-0166095, filed on Dec. 12, 2019, the entire contents of which are incorporated herein by reference.

TECHNICAL FIELD

The present disclosure relates to an apparatus for controlling a vehicle and a method thereof, and more particularly, to an apparatus for controlling a vehicle capable of performing autonomous driving and a method thereof.

BACKGROUND

In general, an autonomous vehicle (also known as a driverless car) refers to a vehicle capable of autonomously monitoring external information and identifying road situations without vehicle manipulation from the driver and performing autonomous driving to a set destination. In autonomous driving, an autonomous driving level may be varied according to a specific condition, for example, the precision of the map the driver refers to for driving the vehicle.

In other words, as the precision of the map increases, an autonomous drivable level and an available autonomous driving function may increase. For example, according to autonomous vehicle classification criteria of National Highway Traffic Safety Administration (NHTSA) in the United States, a level where the driver should completely operate the vehicle may be set to Level 0 as a stage where the driver actively turns the steering wheel, brakes, or looks in front or in the driving direction. A level where the driver actively looks forward without performing another task and leaves (e.g., removes hands from) the steering wheel may be set to Level 1 as a stage where the driver may fail to perform one of left and right driving or forward and backward driving.

Further, a level where the driver actively looks forward and does not perform another task but leaves the steering wheel may be set to Level 2 as a stage where the driver may fail to perform both of left and right driving and forward and backward driving. A level where the driver may perform another task or depart from the driver's seat in the zone converted into a partially safe autonomous mode may be set to Level 3 as a stage where the driver hands over vehicle control to the autonomous vehicle such that the driver may inactively pay attention to the vehicle operation. A level in which the vehicle operates in a complete autonomous mode and where the driver is able to perform another task or depart from the driver's seat after initially entering the destination may be set to Level 4.

Meanwhile, in an autonomous vehicle of Level 3 and higher levels, although the system requests the driver to perform control authority transition, when there is no reaction or response from the driver, or when a severe breakdown occurs, that is, when a critical situation where the autonomous driving system should not continue operating occurs, there is a need for a method capable of predicting the critical situation and suitably corresponding to the critical situation.

SUMMARY

The present disclosure provides an apparatus for controlling a vehicle to suitably respond to a critical situation where an autonomous driving system should not continue operating and a method thereof.

Another aspect of the present disclosure provides an apparatus for controlling a vehicle to identify a trend in enacting regulations associated with an autonomous vehicle in advance and proactively respond to the identified trend and a method thereof. Another aspect of the present disclosure provides an apparatus for controlling a vehicle to cope with a critical situation to minimize a critical element of reducing a vehicle speed or completely stopping a vehicle and a method thereof.

Another aspect of the present disclosure provides an apparatus for controlling a vehicle to perform a subsequent safety ensuring function based on a minimum risk maneuver (MRM) and a method thereof. Another aspect of the present disclosure provides an apparatus for controlling a vehicle to perform advanced emergency accelerating (AEA) according to an MRM and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a vehicle may include: an autonomous driving device configured to execute autonomous driving and generate a transition demand in response to determining an inability to execute the autonomous driving and a driving controller configured to perform a minimum risk maneuver (MRM) of applying a deceleration pattern different depending on a driving environment of the vehicle, in response to receiving the transition demand. Additionally, when driving manipulation by a driver does not occur, the driving controller may be configured to perform a subsequent safety ensuring function based on the MRM for the driver to recognize the MRM, and change a drive mode of the vehicle to a drive mode with a rapid response speed to acceleration or steering.

The autonomous driving device may be configured to generate the transition demand, when the vehicle breaks down, when the vehicle departs from an operational design domain, or when a critical situation incapable of continuing performing the autonomous driving occurs. The driving controller may be configured to perform the MRM, when the vehicle breaks down or when a critical situation incapable of continuing performing the autonomous driving occurs. The driving controller may also be configured to perform the MRM, when the driving manipulation does not occur, after a predetermined time elapses after the transition demand is received.

The apparatus may further include a vehicle speed adjustment device configured to adjust a speed of the vehicle. The MRM may include any one of decelerating to standstill in a lane on which the vehicle is traveling or moving to the outside of the lane on which the vehicle is traveling and decelerating to standstill. The driving controller may be configured to operate the vehicle speed adjustment device to control the deceleration of the vehicle to be less than a predetermined threshold during the MRM.

Additionally, the driving controller may be configured to operate the vehicle speed adjustment device to stop the vehicle, when driving manipulation by the driver does not occur after the MRM or in response to detecting a vehicle or obstacle stopped in front of the lane on which the vehicle is traveling. The apparatus may further include a vehicle light device configured to operate a light of the vehicle. The driving controller may be configured to operate the vehicle light device to turn on/off hazard lights, when driving manipulation by the driver does not occur within a predetermined time after the vehicle stops.

Further, the driving controller may be configured to operate the vehicle light device to turn on/off hazard lights, when a predetermined time elapses during the MRM. The driving controller may be configured to determine whether the driving environment is an urban environment or a high-speed environment using map information or vehicle recognition information and may be configured to apply the deceleration pattern differently depending on whether the driving environment is the urban environment or the high-speed environment.

The driving controller may be configured to apply a deceleration pattern in which a speed of the vehicle is gradually reduced for the MRM, when the driving environment is the urban environment, and may be configured to engage the gear to parking shift after the vehicle stops. The driving controller may also be configured to apply a deceleration pattern in which a speed of the vehicle is maintained during a first time for the MRM and in which a speed of the vehicle is rapidly reduced during a second time less than the first time, when the driving environment is the high-speed environment. Additionally, the driving controller may be configured to apply a deceleration pattern in which speed changes corresponding to the first time and the second time are repeated. The driving controller may be configured to engage the gear to the drive (D) range after the vehicle stops. The driving controller may be configured to execute an AutoHold of braking the vehicle, when the vehicle is in the D-range.

The subsequent safety ensuring function may include at least one of enabling driving rear-view monitoring (DRM), changing an ambient light, outputting a warning sound, enabling a front and rear detection function, enabling blind spot detection (BSD), or changing a drive mode. The driving controller may be configured to selectively perform the subsequent safety ensuring function based on the driving environment or a driving time. The subsequent safety ensuring function may include enabling driving rear-view monitoring (DRM) to display a state where a following vehicle located behind the vehicle (e.g., subject vehicle) is traveling and an inter-vehicle distance between the subject vehicle and the following vehicle.

The subsequent safety ensuring function may include changing an ambient light to change a color of a light device in the vehicle to a red color, adjusting brightness of the light device to maximum brightness, and turning the light device on/off. Further, the subsequent safety ensuring function may include outputting a warning sound to provide a notification to surrounding vehicles of an abnormal situation using an external channel of a warning sound device in the vehicle and outputting a warning sound for notifying the driver of the subject vehicle in which the MRM is being executed using an internal channel of the warning sound device.

The subsequent safety ensuring function may include enabling a front and rear sensor in the vehicle to enable a front and rear detection function of generating a warning sound when another vehicle approaches the subject vehicle after the subject vehicle stops. The subsequent safety ensuring function may include enabling blind spot detection (BSD) to enable blind spot detection (BSD) in the vehicle and to notify the driver that another vehicle is approaching a rear side of the subject vehicle after the subject vehicle stops.

The driving controller may be configured to perform advanced emergency accelerating (AEA) to detect the risk of collision with a following vehicle after the subject vehicle stops, perform a warning operation when the risk of collision is detected, automatically move the subject vehicle forward, and automatically brake the subject vehicle after the subject vehicle moves forward. The driving controller may then be configured to turn off the autonomous driving device after the MRM is completed.

According to another aspect of the present disclosure, a method for controlling a vehicle capable of performing autonomous driving may include: executing the autonomous driving and generating a transition demand in response to determining an inability to execute the autonomous driving, performing a minimum risk maneuver (MRM) of applying a deceleration pattern differently depending on a driving environment of the vehicle, in response to the generation of transition demand, but when driving manipulation by a driver does not occur, and performing a subsequent safety ensuring function according to the MRM for the driver to recognize the MRM.

BRIEF DESCRIPTION OF THE DRAWINGS

The above and other objects, features and advantages of the present disclosure will be more apparent from the following detailed description taken in conjunction with the accompanying drawings:

FIG. 5A-5D is a drawing illustrating advanced emergency accelerating (AEA) according to an exemplary embodiment of the present disclosure.

DETAILED DESCRIPTION

Figure 1:
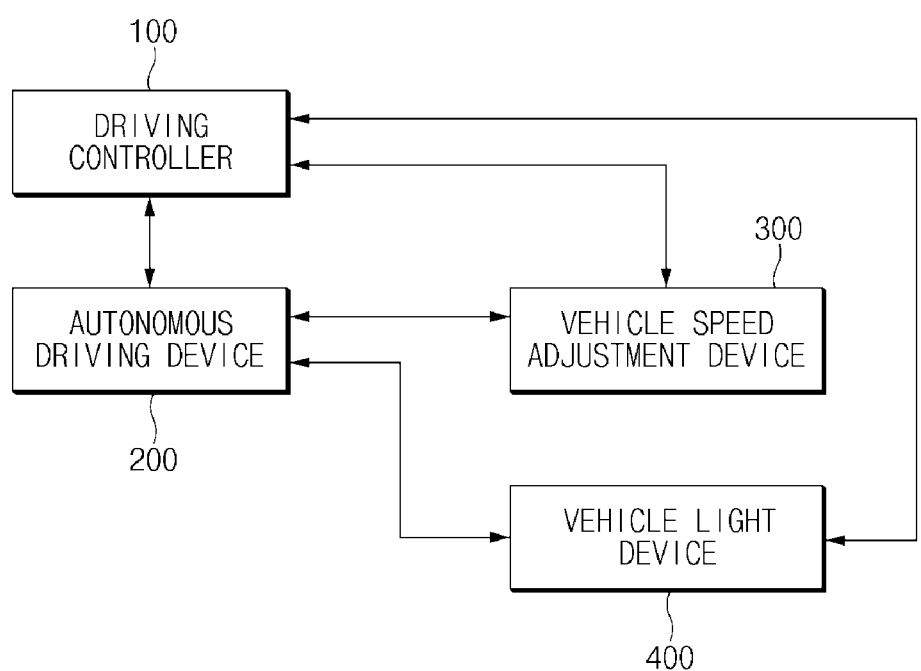
FIG. 1 is a control block diagram illustrating a configuration of an apparatus for controlling a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, a description will be given in detail of exemplary embodiments of the present disclosure with reference to FIGS. 1 and 6. FIG. 1 is a control block diagram illustrating a configuration of an apparatus for operating a vehicle according to an exemplary embodiment of the present disclosure.

Referring to FIG. 1, the apparatus for controlling or operating the vehicle according to an exemplary embodiment of the present disclosure may be implemented in the vehicle and may be operated by a controller. In particular, the apparatus for controlling the vehicle may be integrally formed with controllers within the vehicle, or may be implemented as a separate device to be connected with the controllers of the vehicle by a separate connection. As shown, the apparatus for controlling the vehicle may include a driving controller 100, an autonomous driving device 200, a vehicle speed adjustment device 300, and a vehicle light device 400. The driving controller 100 may be configured to operate the other components of the apparatus.

The vehicle speed adjustment device 300 may be a component involved in a change in speed of the vehicle including a brake and an accelerator pedal, which plays a role in guiding the vehicle to travel through control of the autonomous driving device 200 and the driving controller 100. Furthermore, when the vehicle is an electric vehicle, the vehicle speed adjustment device 300 may be configured as a logic for electronically adjusting a speed of the vehicle without a physical component such as the brake or the accelerator pedal. In other words, the vehicle speed adjustment device 300 may be implemented in the form of adjusting a speed of the vehicle irrespective of a transmission configuration, that is, a physical configuration.

Furthermore, the vehicle light device 400 may include lights installed inside and outside the vehicle. The vehicle light device 400 may be configured to adjust a lighting state necessary for driving under control of the autonomous driving device 200 and the driving controller 100. Furthermore, although not illustrated, the apparatus for controlling the vehicle may further include an audio device configured to generate a particular alarm sound, for example, a beep sound or a warning sound, inside and outside the vehicle and a display configured to capture an image of a front or rear of the vehicle and displaying the captured image. The audio device and the display may assist an MRM to be described below or may participate in driving, under control of the autonomous driving device 200 and the driving controller 100.

As described above, the autonomous driving device 200 may correspond to a module or system which executes autonomous driving of the vehicle. The autonomous driving refers to autonomously monitoring external information and identifying road situations without manipulation of the driver and autonomously operating the vehicle to a set destination. The autonomous driving device 200 may be a controller configured to operate the vehicle speed adjustment device 300, the vehicle light device 400, the audio device, and the display for autonomous driving and may be a set of respective components which performs autonomous driving. The autonomous driving device 200 may be configured to transmit and receive information regarding the initiative of driving via communication with the driving controller 100 described below.

Meanwhile, in response to determining an inability of performing autonomous driving, the autonomous driving device 200 according to an exemplary embodiment of the present disclosure may be configured to generate a transition demand. The inability to perform the autonomous driving may be when a critical situation incapable of continuing performing the autonomous driving occurs, for example, when the vehicle breaks down or when the vehicle departs from an operational design domain.

When the transition demand is generated, it is generally preferable for the authority to operate the vehicle be switched to a driver rather than a system which operates autonomous driving. However, there may be situation when this switch is not possible, and, in such a case, a minimum risk maneuver (MRM) may be performed to protect the driver and the vehicle and minimize occurrence of a collision with a surrounding vehicle. When the transition demand is generated, but when driving manipulation by the driver does not occur (e.g., no driver response is detected in response to outputting the transition demand), the driving controller 100 according to an exemplary embodiment of the present disclosure may be configured to perform the MRM based on an environment where the vehicle is traveling and perform a subsequent safety ensuring function or advanced emergency accelerating (AEA) according to the MRM.

Alternatively, in response to determining that the vehicle breaks down (e.g., malfunctions) or that a critical situation incapable of continuing performing autonomous driving occurs, irrespective of the transition demand, the driving controller 100 may be configured to perform the MRM capable of minimizing the risk. Although a predetermined time elapses after identifying the generation of the transition demand or the critical situation, when driving manipulation by the driver does not occur or is not detected, the driving controller 100 may be configured to perform the MRM. The predetermined time may be less than approximately a few seconds or 10 seconds.

The MRM is applicable to Level 3 and higher levels among five levels of autonomous driving. The operational direction which is now regulated internationally in response to the MRM is to first decelerate to standstill in the lane on which the vehicle is traveling and secondly move to the outside of the lane on which the vehicle is traveling and decelerate to the standstill. The driving controller 100 may be configured to perform the MRM in response to such a global trend. As described above, the driving controller 100 may be configured to perform a deceleration maneuver to decelerate not to be greater than a predetermined threshold per square second, for example, about 4 meters (4 m/s$^2$), when the MRM is started.

In other words, when the MRM is started, the driving controller 100 may be configured to decelerate the vehicle in the lane at a deceleration rate which is less than about 4 meters per square second (4 m/s$^2$). When the lane is not clearly indicated (e.g., lane markings are not detectable or the like), the driving controller 100 may be configured to decelerate in a suitable path in consideration of surrounding traffic and road environments. Herein, when a breakdown occurs or when decelerating within a short time to warn the driver, the driving controller 100 may be configured to decelerate at a rate greater than about 4 meters per square second (4 m/s$^2$).

Meanwhile, the driving controller 100 may be configured to execute a lane change of the vehicle to another lane including a shoulder for the MRM execution. In particular, the lane change may be permitted in only a situation determined to be safe for changing the lane. Furthermore, the driving controller 100 may be configured to continue operating a system according to autonomous driving while the MRM is performed for a safe maneuver and may be configured to reduce a vehicle speed in a range of ensuring a safe operation. Accordingly, the driving controller 100 may be configured to operate the speed vehicle adjustment device 300 such that deceleration of the vehicle is less than a predetermined threshold during the MRM.

Meanwhile, the driving controller 100 may be configured to continue operation of the vehicle unless another vehicle, an obstacle, or the like is detected to be stopped in front of the subject vehicle within a same driving lane. In other words, the driving controller 100 may be configured to operate the vehicle speed adjustment device 300 to stop the vehicle, when a critical situation continues or when it is needed to remove a risk, for example, when driving manipulation by the driver does not occur after the MRM, when there is another vehicle or obstacle stopped ahead of the subject vehicle in the lane in which the subject vehicle is traveling, or in response to an inability to automatically drive such as when an autonomous vehicle breaks down.

Furthermore, the driving controller 100 may be configured to operate the vehicle light device 400 to turn on/off hazard lights when a predetermined time elapses during the MRM. Alternatively, the driving controller 100 may be configured to operate the vehicle light device 400 to turn on/off hazard lights when driving manipulation by the driver does not occur within a predetermined time after the vehicle is stopped. The predetermined time may be set within a range of a few seconds, for example, about four seconds.

Meanwhile, the driving controller 100 may be configured to perform a safety ensuring function subsequent to the MRM. The subsequent safety ensuring function may include at least one or more of enabling driving rear-view monitoring (DRM), changing an ambient light, outputting a warning sound, enabling a front and rear detection function, enabling blind spot detection (BSD), or changing a drive mode. The driving controller 100 according to an exemplary embodiment of the present disclosure may be configured to selectively perform the subsequent safety ensuring function based on a driving environment or a driving time.

Furthermore, the driving controller 100 may be configured to perform advanced emergency accelerating (AEA) subsequent to the MRM. Accordingly, the driving controller 100 may be configured to detect whether there is the risk of rear-end collision, perform a warning operation in response to detecting the risk of collision, automatically move the vehicle forward, and stop the vehicle after moving forward. The subsequent safety ensuring function and the advanced emergency accelerating (AEA) will be described below with reference to FIGS. 4 and 5.

When the MRM is completed, the driving controller 100 may be configured to automatically release the system, that is, the autonomous driving system (off mode) and may facilitate an operation (e.g., a run mode) of the autonomous driving system after a driving start/run cycle is newly started. Herein, when there is no driving manipulation by the driver, the driving controller 100 should maintain a system stop state. In particular, the driving controller 100 may be configured to turn off a lane change function of moving to the shoulder, and maintain a function of turning on/off hazard lights until manipulation of the driver.

Figure 2:
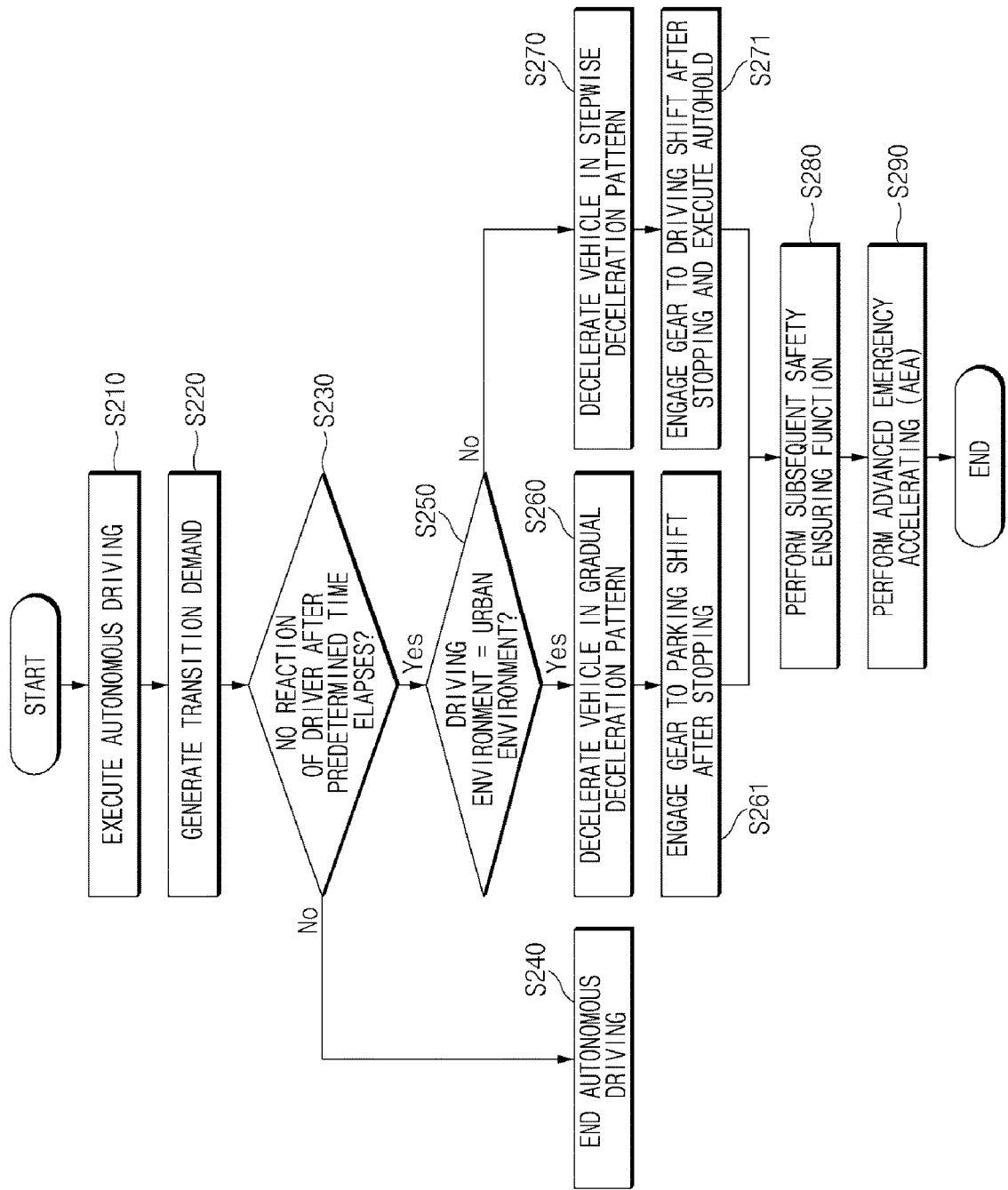
FIG. 2 is a control flowchart illustrating a method for controlling a vehicle according to an exemplary embodiment of the present disclosure.

Hereinafter, a description will be given in detail of a method for controlling a vehicle according to an exemplary embodiment of the present disclosure with reference to FIG. 2. FIG. 2 is a control flowchart illustrating a method for controlling a vehicle according to an exemplary embodiment of the present disclosure. Hereinafter, it is assumed that an apparatus for controlling a vehicle in FIG. 1, particularly, a driving controller 100 performs a process of FIG. 2. Furthermore, in a description of FIG. 2, an operation described as being performed by an apparatus may be understood as being mainly executed by the driving controller 100 of the apparatus for operating the vehicle.

First of all, in S210, when autonomous driving is executed by an autonomous driving device 200 of FIG. 1, the vehicle may be driven without manipulation of a driver or without manipulation of a partial driving function. Thereafter, in response to detecting an inability to perform the autonomous driving, when the vehicle breaks down due to the autonomous driving device 200, or when a critical situation incapable of continuous performing the autonomous driving occurs, a transition demand may be generated by the apparatus.

When the transition demand is generated, in S230, the apparatus may be configured to determine whether driving manipulation does not occur after a predetermined time elapses, that is, whether there is no reaction of the driver after the predetermined time elapses. When the driving manipulation occurs after the predetermined time elapses, in S240, the autonomous driving may be terminated and driving may be performed by the driver. However, when there is the no reaction of the driver after the predetermined time elapses (e.g., no driver input is detected after the predetermined time), in S250, the apparatus may be configured to detect a driving environment of the vehicle.

The apparatus may be configured to determine whether the driving environment is an urban environment or a high-speed environment using map information or vehicle recognition information. The urban environment may be detected in response to determining that a stop situation in the lane is frequent, that a safety distance between vehicles is less than a predetermined distance, and that a probability of secondary collision after stopping is low. In particular, in response to detecting the urban environment, it is necessary to perform driving for preventing a low-speed collision or the like, such as a minor collision, and minimizing a braking distance.

The high-speed environment may be detected in response to determining that a stop situation in the lane is infrequent, that a safety distance between vehicles is greater than a predetermined distance, and that a probability of secondary collision after stopping is high. In particular, in response to detecting the high-speed environment, it is necessary to perform vehicle operation for allowing the driver to detect a situation for an MRM and it is necessary to be converted into a "mode for preparing for collision" for minimizing the damage of a second collision. Meanwhile, when the driving environment is the high-speed environment on the highway, but when it is a congested situation, an operation method for the urban environment may be enabled.

As a result of the determination, when the driving environment is the urban environment in S250, in S260, the apparatus may be configured to gradually reduce a speed of the vehicle. In S261, the apparatus may be configured to engage the gear to parking shift (P-range) after the vehicle stops.

On the other hand, when the driving environment is the high-speed environment in S250, in S270, the apparatus may be configured to reduce a speed of the vehicle in a stepwise manner. In S271, the apparatus may be configured to engage the gear to driving shift (D-range) after the vehicle stops and execute the AutoHold. The AutoHold refers to a function of enabling electronic stability control (ESC) and stopping the vehicle when a driving speed is 0 k/h although the transmission of the vehicle is the D-range. In particular, if necessary, it may be possible to engage an electronic parking brake (EPB).

Figure 3:
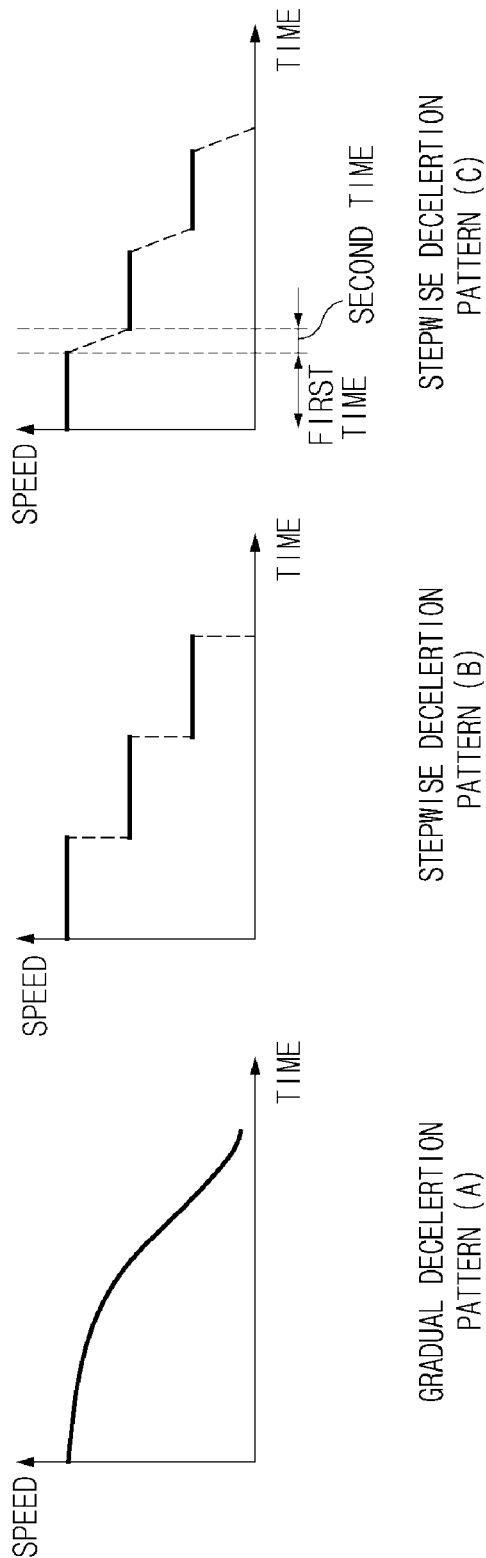
FIGS. 3A-3C are graphs illustrating a deceleration pattern of a minimum risk maneuver (MRM) according to an exemplary embodiment of the present disclosure.

FIGS. 3A-3C are graphs illustrating a deceleration pattern of an MRM according to an exemplary embodiment of the present disclosure. A driving controller 100 of FIG. 1 may be configured to apply a gradual deceleration pattern 'a' depending on a driving situation or apply a stepwise deceleration pattern 'b' if necessary. For example, to prevent a collision with an adjacent forward vehicle due to being pushed forward upon a secondary collision, when the driving environment is an urban environment, the driving controller 100 may be configured to apply a gradual deceleration pattern such as the gradual deceleration pattern 'a'.

Meanwhile, when the driving environment is a high-speed environment, the driving controller 100 may be configured to generate an intentional deceleration impact and apply a stepwise deceleration pattern such as the stepwise deceleration pattern 'b' to guide a driver to recognize a situation where an MRM is being execute. Accordingly, the stepwise deceleration pattern may be to finally attempt to hand over the authority to control operation of the vehicle to the driver.

The stepwise deceleration pattern may refer to a deceleration pattern in which a speed of the vehicle is maintained or gradually reduced during a first period of time, in which a speed of the vehicle is rapidly reduced during a second period of time shorter than the first period of time, and in which speed changes corresponding to the first time and the second time are repeated. In particular, the second period of time when the speed is rapidly reduced is relatively shorter than the first period of time when the speed is maintained or gradually reduced. Since the second time is shorter, the unnatural sense of braking may be further generated.

The ideal stepwise deceleration pattern may be represented as a speed-time graph such as the stepwise deceleration pattern 'b'. However, since it is difficult to discontinuously reduce a physical speed of the real vehicle such as the stepwise deceleration pattern 'b', a stepwise deceleration pattern such as a stepwise deceleration pattern 'c' may be applied to an MRM. As described above, the driving controller 100 may be configured to perform maximal rapid deceleration during the short period of time (e.g. the second period of time) to implement the unnatural sense of braking, thus allowing the driver to recognize that the MRM is being performed. The first time varies depending on the amount of deceleration, but means a time of deceleration of about 10 km/h (or 5 mph) (for example, 5 seconds when decelerating another line). The second time refers to a time (for example, less than 1 second) that minimizes discomfort to the passenger due to the rapid deceleration but can be clearly recognized.

Of course, such a dualistic deceleration pattern is not limited to a specific environment, which may be adaptively applied according to situations, for example, whether there are many surrounding vehicles and a distance between vehicles. Table 1 below provides an example of applying the deceleration pattern depending on a driving environment according to an exemplary embodiment of the present disclosure.

TABLE 1

| Classification | Urban condition | High-speed condition |
| --- | --- | --- |
| Shift pattern after stopping | Engage the gear to P-range (Parking shift) after stopping | Engage the gear to D-range (Driving shift) after stopping |
| Purposes | Prevent collision with adjacent forward vehicle due to being pushed upon secondary collision | Reduce impact amount upon secondary collision, It is possible to immediately perform manipulation upon |

TABLE 1-continued

| Classification | Urban condition | High-speed condition |
|---|---|---|
| Situation examples | city driving, congested situation at highway (Map/speed condition), or the like | override of control authority by driver Highway, urban expressway, industrial road, or the like |

Figure 4:
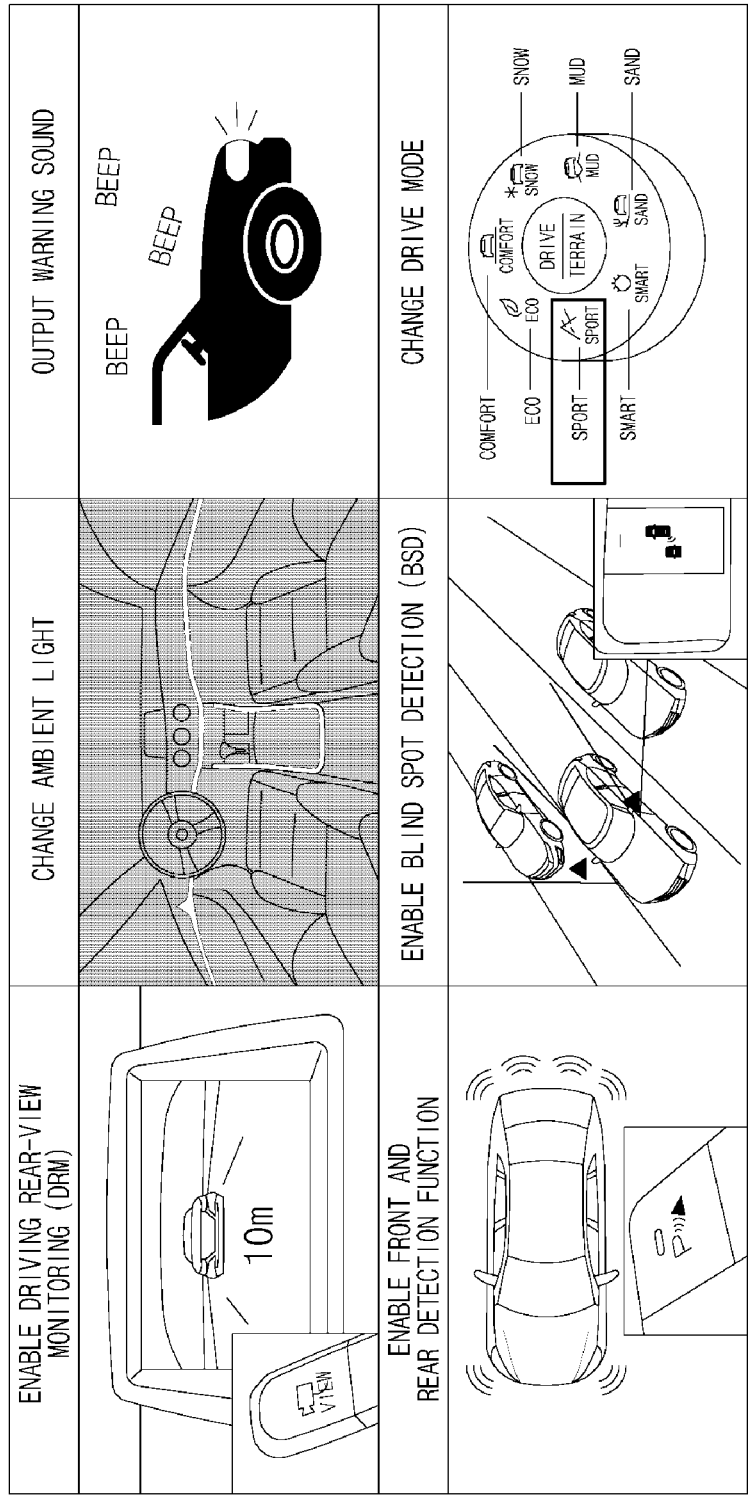
FIG. 4 is a drawing illustrating a subsequent safety ensuring function according to an exemplary embodiment of the present disclosure.

Return to FIG. 2, when the MRM is performed, in S280, the driving controller 100 may be configured to perform a subsequent safety ensuring function, such that the driver may more easily recognize and correspond to the situation where the MRM is being performed and such that further damage may be minimized. Such a subsequent safety ensuring function may include at least one of enabling driving rear-view monitoring (DRM), changing an ambient light, outputting a warning sound, enabling a front and rear detection function, enabling blind spot detection (BSD), or changing a drive mode. FIG. 4 illustrates a subsequent safety ensuring function according to an exemplary embodiment of the present disclosure.

The function of enabling the driving rear-view monitoring (DRM) may be to compulsorily enable the DRM while driving to display an inter-vehicle distance as shown in FIG. 4. The function of enabling the DRM may provide a notification to a driver of a state where a following vehicle is traveling while the subject vehicle stops (e.g., the rear vehicle continues to travel forward but the subject vehicle is stopped), an inter-vehicle distance between the subject vehicle and the following or rear vehicle, and the like such that the driver may more easily recognize a current situation.

Furthermore, the function of changing the ambient light may be to change a color of the ambient light, for example, turn on a red light capable of being intuitively recognized by the driver, or to change brightness of the ambient light to a maximum value. In particular, it may be possible to perform control of changing an operation state of the ambient light from ON to OFF. As a result, a driving controller 100 of FIG. 1 may be configured to warn the driver regarding a critical situation.

Furthermore, the driving controller 100 may be configured to output a warning sound using a warning sound channel of the vehicle. In particular, the driving controller 100 may be configured to output a warning sound to provide a notification to surrounding vehicles of an abnormal situation using an external channel of a warning sound device in the vehicle and provide a notification to the user of a situation where an MRM is being executed or where a host vehicle enters the MRM using an internal channel of the warning sound device within the vehicle. As a result, the driving controller 100 may be configured to warn the driver and a surrounding driver of the critical situation.

Furthermore, the driving controller 100 may enable a front and rear detection function. The driving controller 100 may compulsorily enable a front and rear sensor used for a parking assist function to generate a warning sound. The front and rear sensor may be turned off when the vehicle speed is greater than about 20 k/h, and may be turned on when the vehicle is shifted into reverse. In an exemplary embodiment of the present disclosure, the front and rear sensor may be operated to warn an approaching vehicle after the host or subject vehicle stops. Additionally, the driving controller 100 may enable blind spot detection (BSD). The BSD may be enabled to notify the driver of a vehicle approaching a rear side of the host or subject vehicle when the host vehicle stops, to allow the driver to recognize a current situation, and may be subsidiarily used to determine a lane change upon control authority transition.

The driving controller 100 may be configured to change a drive mode of the vehicle to a sport mode or an MRM mode using a drive mode function. The MRM mode may be a drive mode for an MRM, which includes rapid acceleration and steering responsibility, in which steering effort is developed to be lower than that in a general driving situation. In other words, since the sport mode and the MRM mode have the quickest acceleration and steering response speed, it may be possible to rapidly respond upon control authority transition.

The function of changing the drive mode may be performed as a default function after the MRM independently of the other subsequent safety ensuring functions. The above-mentioned six subsequent safety ensuring functions may be suitably operated by reflecting an urban condition or a driving time. Theses may be represented as Tables 2 and 3 below.

TABLE 2

| Classification | Urban condition |
|---|---|
| ① | Enable driving rear-end monitoring (DRM) |
| ② | Change ambient light |
| ③ | Provide warning sound (audible) and hazard lights (visual) |
| ④ | Enable front and rear detection function (parking sensor) |
| ⑤ | Enable blind spot detection (BSD) |
| ⑥ | Change drive mode |

TABLE 3

| Surrounding situations | | Selective application items |
|---|---|---|
| High-speed driving | Day | ①, ③, ⑤, ⑥ |
| | Night | ①, ②, ③, ⑤, ⑥ |
| Urban driving | Day | ③, ④, ⑤, ⑥ |
| | Night | ②, ③, ④, ⑤, ⑥ |
| Low illumination intensity & Communication shadow (tunnel or the like) | | ①, ②, ③, ④, ⑤, ⑥ |

As shown in Table 3 above, when the driving environment is high-speed driving of a high-speed environment and when it is day time, the functions of enabling driving rear-end monitoring (DRM), outputting a warning sound, enabling blind spot detection (BSD), and changing a drive mode may be used among the six subsequent safety ensuring functions. In a low illumination intensity and communication shadow area such as a tunnel, all the functions may be used.

Table 3 above is an example of adaptively using the subsequent safety ensuring functions. This may be subdivided with regard to a weather environment or a communication environment where it snows or rains, or a degree of the function and the number of selected functions may be changed.

Moreover, as described above, the function of changing the drive mode to a drive mode with a rapid response speed to acceleration or steering may be performed in all driving environments. Accordingly, after the MRM and the safety ensuring function subsequent to the MRM may be performed, when the vehicle stops, in S290, the driving controller 100 may be configured to perform advanced emergency accelerating (AEA). The AEA is the inverse concept of existing autonomous emergency brake (AEB) and corresponds to control of automatically moving the vehicle forward when detecting the risk of collision with a following or rear vehicle to reduce an impact.

FIG. 5 is a drawing illustrating advanced emergency accelerating (AEA) according to an exemplary embodiment of the present disclosure. As shown in FIG. 5, in operation a, a driving controller 100 of FIG. 1 may be configured to detect the risk of collision with a following or rear vehicle to perform AEA. In response to detecting the risk of collision, in operation b, the driving controller 100 may be configured to perform a warning operation. In operation c, the driving controller 100 may be configured to automatically move the vehicle forward. After the vehicle moves forward, in operation d, the driving controller 100 may be configured to automatically brake the vehicle.

Accordingly, the apparatus for controlling the vehicle according to an exemplary embodiment of the present disclosure may ensure minimum safety when it is impossible to perform control authority transition of the autonomous vehicle to correspond to the legalized institution. Furthermore, the apparatus for controlling the vehicle according to an exemplary embodiment of the present disclosure may suitably correspond to a critical situation where an autonomous driving system should not continue operating and may minimize a critical element of reducing a vehicle speed or completely stopping the vehicle in response to the critical situation.

Figure 6:
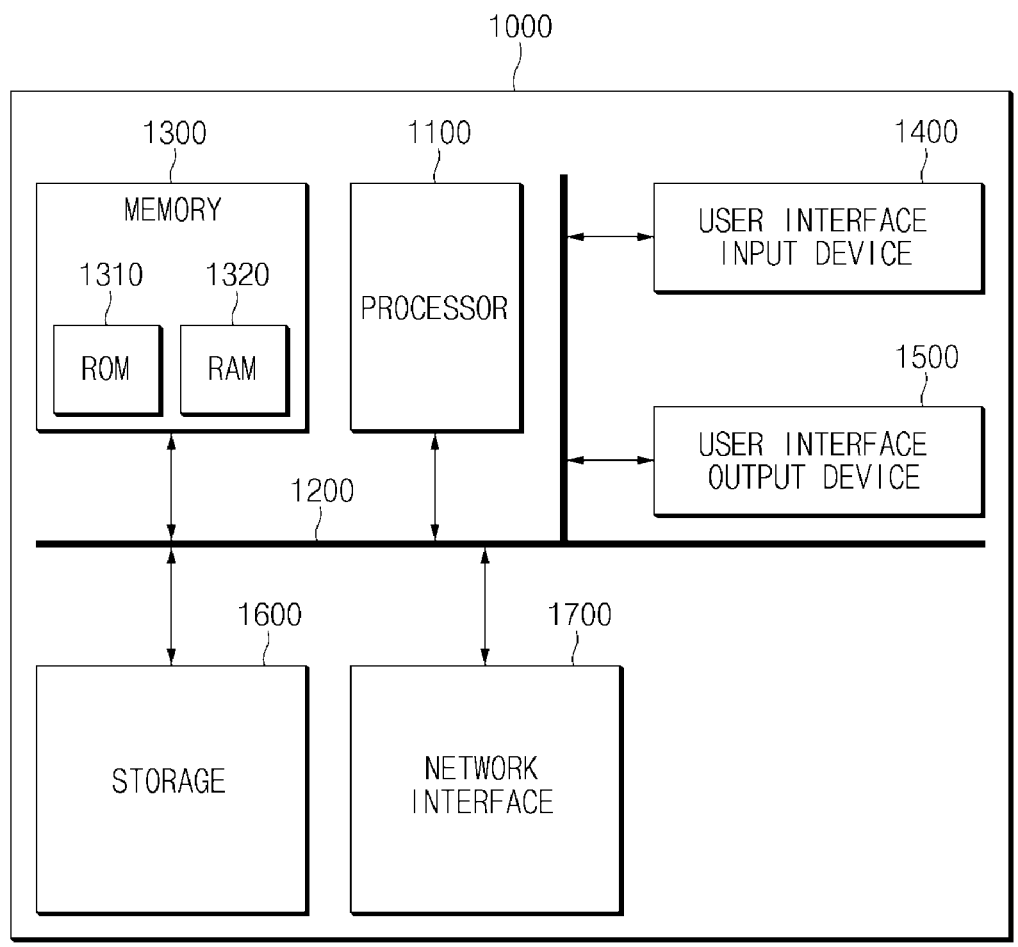
FIG. 6 is a block diagram illustrating a computing system according to an exemplary embodiment of the present disclosure.

FIG. 6 is a block diagram illustrating a computing system according to an exemplary embodiment of the present disclosure. Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may provide the apparatus for controlling the vehicle to suitably correspond to a critical situation where an autonomous driving system does not continue operating and the method thereof. An exemplary embodiment of the present disclosure may provide the apparatus for controlling the vehicle to identify a trend in enacting regulations associated with an autonomous vehicle in advance and proactively correspond to the identified trend and the method thereof.

An exemplary embodiment of the present disclosure may provide the apparatus for controlling the vehicle to cope with a critical situation to minimize a critical element of reducing a vehicle speed or completely stopping the vehicle and the method thereof. Furthermore, an exemplary embodiment of the present disclosure may provide the apparatus for controlling the vehicle to perform a subsequent safety ensuring function according to the MRM and the method thereof.

Additionally, an exemplary embodiment of the present disclosure may provide the apparatus for controlling the vehicle to perform advanced emergency accelerating (AEA) according to the MRM and a method thereof. Various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a vehicle capable of performing autonomous driving, comprising:
   an autonomous driving device configured to execute the autonomous driving and generate a transition demand in response to determining an inability to execute the autonomous driving; and
   a driving controller configured to perform a minimum risk maneuver (MRM) of applying a deceleration pattern differently depending on a driving environment of the vehicle, in response to the transition demand being generated, and in response to not receiving a driving manipulation by a driver, perform a subsequent safety ensuring function according to the MRM, and change a drive mode of the vehicle to a drive mode with a rapid response speed to acceleration or steering,
   wherein the driving controller is configured to:
      wherein the driving controller is configured to perform advanced emergency accelerating (AEA) to detect the risk of collision with a following vehicle after the vehicle stops, perform a warning operation in response to detecting the risk of collision, automatically move the vehicle forward, and automatically brake the vehicle after the vehicle moves forward.

2. The apparatus of claim 1, further comprising:
   a vehicle speed adjustment device configured to adjust a speed of the vehicle,
   wherein the MRM includes any one of decelerating to standstill in a lane on which the vehicle is traveling or moving to the outside of the lane on which the vehicle is traveling and decelerating to standstill, and
   wherein the driving controller is configured to operate the vehicle speed adjustment device to adjust deceleration of the vehicle to be less than a predetermined threshold during the MRM.

3. The apparatus of claim 2, wherein the driving controller is configured to operate the vehicle speed adjustment device to stop the vehicle, in response to not receiving the driving manipulation by the driver after the MRM is executed or in response to detecting another vehicle or an obstacle stopped in front of the vehicle in the lane on which the vehicle is traveling.

4. The apparatus of claim 3, further comprising:
a vehicle light device configured to operate a light of the vehicle,
wherein the driving controller is configured to operate the vehicle light device to turn on/off hazard lights, in response to not detecting the driving manipulation by the driver within a predetermined time after the vehicle stops.

5. The apparatus of claim 1, wherein the driving controller is configured to determine whether the driving environment is the urban environment or the high-speed environment using map information or vehicle recognition information and differently apply the deceleration pattern depending on whether the driving environment is the urban environment or the high-speed environment.

6. The apparatus of claim 5, wherein the driving controller is configured engage the gear to parking shift after the vehicle stops when the driving environment is the urban environment.

7. The apparatus of claim 5, wherein the driving controller is configured to apply a deceleration pattern in which a speed of the vehicle is maintained during a first period of time for the MRM and in which a speed of the vehicle is rapidly reduced during a second period of time shorter than the first period of time, when the driving environment is the high-speed environment.

8. The apparatus of claim 7, wherein the driving controller is configured to apply a deceleration pattern in which speed changes corresponding to the first period of time and the second period of time are repeated.

9. The apparatus of claim 7, wherein the driving controller is configured to engage the gear to the drive (D) range after the vehicle stops.

10. The apparatus of claim 9, wherein the driving controller is configured to execute an AutoHold of braking the vehicle, when the vehicle is in the D-range.

11. The apparatus of claim 1, wherein the subsequent safety ensuring function includes enabling driving rear-view monitoring (DRM) to display a state where a following vehicle located behind the vehicle is traveling and an inter-vehicle distance between the vehicle and the following vehicle.

12. The apparatus of claim 1, wherein the subsequent safety ensuring function includes changing an ambient light to change a color of a light device in the vehicle to a red color, adjusting brightness of the light device to maximum brightness, and turning the light device on/off.

13. The apparatus of claim 1, wherein the subsequent safety ensuring function includes outputting a warning sound to provide a notification to surrounding vehicles of an abnormal situation using an external channel of a warning sound device in the vehicle and outputting a warning sound to provide a notification to the driver of the MRM using an internal channel of the warning sound device.

14. The apparatus of claim 1, wherein the subsequent safety ensuring function includes enabling a front and rear sensor within the vehicle to enable a front and rear detection function of generating a warning sound when another vehicle is approaching the vehicle after the vehicle stops.

15. The apparatus of claim 1, wherein the subsequent safety ensuring function includes enabling blind spot detection (BSD) to enable blind spot detection (BSD) in the vehicle and provide a notification to the driver that another vehicle is approaching a rear side of the vehicle after the vehicle stops.

16. A method for controlling a vehicle capable of performing autonomous driving, comprising:
executing, by a controller, the autonomous driving and generating a transition demand in response to detecting an inability to execute the autonomous driving;
performing, by the controller, a minimum risk maneuver (MRM) of applying a deceleration pattern differently depending on a driving environment of the vehicle, when the transition demand is generated, and when driving manipulation by a driver is not detected; and
performing, by the controller, a subsequent safety ensuring function according to the MRM;
wherein the performing of the MRM includes:
when the driving environment is the urban environment; and
applying, by the controller, a deceleration pattern in which a speed of the vehicle is reduced in a stepwise manner for the MRM, when the driving environment is a high-speed environment.

17. The method of claim 16, wherein the performing of the MRM includes:
determining, by the controller, whether the driving environment is the urban environment or the high-speed environment using map information or vehicle recognition information; and
differently applying, by the controller, the deceleration pattern depending on whether the driving environment is the urban environment or the high-speed environment.

18. The method of claim 17, wherein the performing of the MRM further includes:
engaging, by the controller, the gear to parking shift after the vehicle stops.

19. The method of claim 18, wherein the performing of the MRM includes:
applying, by the controller, a deceleration pattern in which a speed of the vehicle is maintained during a first period of time for the MRM and in which a speed of the vehicle is rapidly reduced during a second period of time shorter than the first period of time, when the driving environment is the high-speed environment;
engaging, by the controller, the gear to the drive (D) range after the vehicle stops; and
executing, by the controller, an AutoHold of braking the vehicle, when the vehicle is in the D-range.

20. The method of claim 19, wherein the performing of the MRM further includes:
applying, by the controller, a deceleration pattern in which speed changes corresponding to the first period of time and the second period of time are repeated.

21. The method of claim 16, wherein the performing of the subsequent safety ensuring function includes:
performing, by the controller, at least one of enabling driving rear-view monitoring (DRM), changing an ambient light, outputting a warning sound, enabling a front and rear detection function, or enabling blind spot detection (BSD), and
wherein the subsequent safety ensuring function is selectively performed according to the driving environment or a driving time.

* * * * *